United States Patent
Ueyama et al.

[11] Patent Number: 5,501,896
[45] Date of Patent: Mar. 26, 1996

[54] MAGNETIC RECORDING MEDIUM

[75] Inventors: Yasuhiro Ueyama, Kadoma; Keiichi Ochiai, Hiroshima; Tetsuo Satake, Osaka; Hideaki Komoda, Hirakata; Hideo Hatanaka, Neyagawa, all of Japan

[73] Assignee: Matsushita Electric Industrial Co., Ltd., Kadoma, Japan

[21] Appl. No.: 308,967

[22] Filed: Sep. 20, 1994

Related U.S. Application Data

[63] Continuation of Ser. No. 756,221, Sep. 9, 1991, abandoned.

[30] Foreign Application Priority Data

Sep. 10, 1990 [JP] Japan ................................ 2-240823
Nov. 30, 1990 [JP] Japan ................................ 2-337992

[51] Int. Cl.$^6$ ................................ B32B 5/16; G11B 5/66
[52] U.S. Cl. ................................ 428/323; 428/329; 428/402; 428/407; 428/694 B; 428/694 BS; 428/694 BB; 428/694 BN; 428/900
[58] Field of Search ................................ 428/363, 357, 428/402, 407, 900, 694 B, 694 BS, 694 BB, 694 BN, 323, 329

[56] References Cited

U.S. PATENT DOCUMENTS

| | | | |
|---|---|---|---|
| 4,568,619 | 2/1986 | Miller | 428/694 |
| 4,746,558 | 3/1988 | Shimozawa et al. | 428/141 |
| 4,863,793 | 9/1989 | Ogawa et al. | 428/323 |
| 4,910,068 | 3/1990 | Takagi et al. | 428/141 |
| 4,963,433 | 10/1990 | Ogawa et al. | 428/323 |
| 5,019,446 | 5/1991 | Bunnell | 428/324 |

FOREIGN PATENT DOCUMENTS

| | | |
|---|---|---|
| 49-3121 | 1/1974 | Japan. |
| 55-28507 | 2/1980 | Japan. |
| 59-58629 | 4/1984 | Japan. |
| 59-92436 | 5/1984 | Japan. |
| 59-223937 | 12/1984 | Japan. |
| 60-15436 | 1/1985 | Japan. |
| 60-5417 | 1/1985 | Japan. |
| 60-143433 | 7/1985 | Japan. |
| 60-205821 | 10/1985 | Japan. |
| 61-8723 | 1/1986 | Japan. |
| 61-287030 | 12/1986 | Japan. |
| 61-278020 | 12/1986 | Japan. |
| 62-197924 | 9/1987 | Japan. |
| 62-197925 | 9/1987 | Japan. |
| 63-29318 | 2/1988 | Japan. |
| 63-29334 | 6/1988 | Japan. |
| 64-60819 | 3/1989 | Japan. |
| 1-43364 | 9/1989 | Japan. |
| 2-26285 | 6/1990 | Japan. |

*Primary Examiner*—Leszek Kiliman
*Attorney, Agent, or Firm*—Cushman, Darby & Cushman

[57] ABSTRACT

In the magnetic recording medium, the non-magnetic substrate has an under-coat layer including the first flake powder of non-magnetic material on its surface and further has a back-coat film including the second flake powder of non-magnetic material on the opposite face on the non-magnetic substrate to the one face coated by the magnetic film; thereby splendid property of running durability and electromagnetic transducing characteristics is achieved in spite of thinning the total thickness of the magnetic recording medium.

9 Claims, 7 Drawing Sheets

Average particle diameter of the flake powder (having an aspect ratio of 100) in the coating material (A'-1) for the under-coat film of the Example 1'

Average particle diameter of the flake powder (having an aspect ratio of 80) in the coating material (B'-1) for the back-coat film of the Example 1'

MAGNETIC RECORDING MEDIUM

This is a continuation of U.S. application No. 07/756,221, filed on Sep. 9, 1991, which was abandoned.

FIELD OF THE INVENTION AND RELATED ART STATEMENT

1. Field of the Invention

The present invention relates to magnetic recording medium (e.g. magnetic tape, video tape, flexible disk), which has, on a non-magnetic substrate, a magnetic layer on one surface thereof and a back-coat film on the other surface thereof.

2. Description of the Related Art

The magnetic recording medium is usually used as a medium on which a magnetic signal is recorded, and the media in the form of a tape, disk, card, etc. are used depending on ways of use.

In recent years, high density magnetic recording is required in the magnetic recording. And recent development results in a short wave length of magnetic recording signal. Especially in a tape-shaped magnetic recording medium it results in an extraordinarily small total thickness of the tape in order to enlarge recording capacity.

Concerning the short wave length of magnetic recording signal, the smoothing of surface of the magnetic film is required in all types of medium such as a coated magnetic recording medium (which consists of a magnetic film including powdered ferromagnetic material and binder(s) thereof on a non-magnetic substrate) and a metal film type magnetic recording medium (which consists of a magnetic metal film formed by a method of (e.g. a vapor deposition, a sputtering, an ion plating or a plating). Accompanied by highly smoothing of the surface of the magnetic film, friction coefficient of the surface of the magnetic film shows a rising tendency. And such increased friction deteriorates stable runability and/or running durability of the tape.

Furthermore, the above-mentioned decrease of total thickness of tape-shaped magnetic recording medium also remarkably deteriorates the stable runability and/or running durability of the tape. And characteristics for recording electric signals in magnetization and for converting such magnetization back into electric signals (hereinafter both are referred to as electromagnetic transducing characteristics) are also deteriorated by the decrease of total thickness of the magnetic recording tape. These deteriorations are caused by a considerable reduction of the stiffness of the tape, which results from the decrease of total thickness of the magnetic recording tape. The reason why the stiffness of the tape has an effect on the electromagnetic transducing characteristic is elucidated hereinafter, by taking an example of a VTR tape.

A VTR tape runs being wound on and around several tape guide posts at a predetermined angle. Some tape guide posts are disposed to control upper side edge position of the running VTR tape and others are disposed to control lower side edge position of the running VTR tape. In case the running VTR tape is about to be off a tape guide post, a stiffness (which is reaction force against an external force which is about to change the shape of the VTR tape) of the VTR tape itself acts as a keeping force for keeping the VTR tape on the guide post.

Further, the stiffness of the VTR tape creates a controlling force for controlling "characteristic of a contact" of a magnetic head (for recording/reproducing) with the VTR tape having a constant tension at running. The "characteristic of the contact" is defined by a gap between the surface of the VTR tape and the surface of the magnetic head and stability of the gap. Thus, in case the stiffness of the tape is reduced owing to the total thickness of the tape, the above-mentioned keeping force and controlling force decrease. Resultantly, the following problems occur such that: folds of the VTR tape are made in running, and/or the side edge(s) of the VTR tape is (are) stretched into undulant shape. In addition to these problems, deterioration of the electromagnetic transducing characteristics (especially the characteristic for converting from magnetizations to electric signals) or unstableness thereof is likely to occur.

There was already proposed that a smooth surface of the magnetic film has been achieved as a way for improvement of a stable runability (characteristic) and running durability by forming a back-coat film which consists of a dispersed powder in inorganic material binder(s) on a non magnetic substrate. Examples of the way for such improvement are shown, for instance in the gazette of the Japanese unexamined patent applications (Tokkai) Sho 55-28507, Sho 59-223937, Sho 60-5417 and Sho 61-287030. Though considerable improvement is made by the proposed ways, It is not enough.

In case of the magnetic recording medium having an extraordinarily small total thickness (e.g. a VHS type VTR tape having the thickness of less than 16 μm or an 8 mm VTR type tape having the thickness of less than 11 μm), in order to improve the stiffness of the magnetic recording medium having the small thickness, investigation has been made to increase the stiffness of the non-magnetic substrate, the magnetic film and/or the back-coat film.

There has been investigation as a way for improvement of the stiffness of the non-magnetic substrate, such new materials as aromatic polyamide or aromatic polyimide having good characteristic such as large stiffness and high heat-resisting property is used as a non-magnetic substrate, instead of typical conventional material such as polyester materials e.g. polyethylene terephthalate (hereinafter it is abbreviated to PET) and polyethylene naphthalate (hereinafter it is abbreviated to PEN), which materials of PET and the PEN have been known as non-magnetic substrate of tape or disk-shaped magnetic recording medium. Examples of the new material for such improvement are shown, for instance in the gazettes of the Japanese examined patent applications (Tokko) Sho 49-3121 and Hei 1-43364 and the Japanese unexamined patent application (Tokkai) Sho 60-15436. But, the above-mentioned new materials, though which has good characteristics, are much expensive than the conventional one i.e. PET or PEN, and further more, these materials have some defects e.g. poor adhesive property (adhesiveness) to the magnetic film and the back-coat film and large hygroscopicity. Thus, these materials having good characteristics are not good enough for improvement of the stiffness.

It has been proposed as a way for improvement of the stiffness of the non-magnetic substrate to form a metal thin film on the non-magnetic substrate by an adhesion or a vapor deposition. Examples of the way for such improvement are shown, for instance in the gazette of the Japanese unexamined patent applications (Tokkai) Sho 60-143433, Sho 60-205821 and Sho 63-29318. But the magnetic recording medium obtained by the above-mentioned way shows some problems (e.g. cutting is difficult due to nature of the metal thin film and poor adhesive property of the metal thin film to the magnetic film and the back-coat film).

It has been investigated as a way for improvement of the stiffness of the magnetic film and/or the back-coat film, that a resin having a high glass-transition temperature is used as a binder(s) in the magnetic film and/or the back-coat film, or that a fibrous reinforcing filler is mixed in the binder(s) of these films. Examples of the way for such improvement are shown, for instance in the gazette of the Japanese examined patent applications (Tokko) Hei 2-226385, Sho 63-29934 Japanese unexamined patent applications (Tokkai) Sho 61-8723, Sho 61-278020. But, because of using the resin having a high glass-transition temperature, remarkable improvement of the stiffness can not be obtained. And further, it becomes hard to smooth the surface of the magnetic film or the back-coat film owing to hardening of the resin itself, and it is difficult to keep good dispersion of the powdered magnetic material and/or the inorganic material, as well as sufficient reactivity to a cross linking agent and high wear resistance respectively. The way of mixing the fibrous reinforcing filler in the binder(s) gives only insufficient stiffness and smoothness of these films (magnetic film and the back-coat film), since it is difficult to have good dispersion and orientation of the filler. Thus, both the conventional proposed ways show numerous problems.

It has been difficult to provide a comparatively inexpensive magnetic recording medium enabling (stable runability and) sufficient running durability without deterioration of the electromagnetic transducing characteristics under recent requirements, wherein the very thin magnetic recording medium having highly smoothened magnetic film is required in order to realize high density magnetic recording and large recording capacity.

OBJECT AND SUMMARY OF THE INVENTION

The present invention is intended to solve the above-mentioned problems shown in the related arts. The purpose of the present invention is to provide a magnetic recording medium having improved running (characteristic) and running durability, even under requirements of thinning the total thickness of the magnetic recording medium and smoothening the magnetic film, realizing high density magnetic recording and large recording capacity.

These objects are accomplished by a magnetic recording medium comprising:

- a non-magnetic substrate having an under-coat film including a first flake powder of non-magnetic inorganic material and binder(s) and formed on one surface thereof;
- a magnetic film formed on either one face of the non-magnetic substrate; and
- a back-coat film including a second flake powder of non-magnetic inorganic material and binder(s) and formed on opposite face of the non-magnetic substrate to the one face covered by the magnetic film.

According to the magnetic recording medium of the present invention, the stiffness thereof is remarkably improved without deterioration of electromagnetic transducing characteristics.

The under-coat film and the back-coat film in the magnetic recording medium have little anisotropy of the elastic modulus in the plane thereof, and the under-coat film and the back-coat film have higher elastic modulus than that of PET or PEN. This is because the first and second flake powders of non-magnetic inorganic material are mixed with respective binder(s) to form the under-coat film and the back-coat film, and the first and second flake powders are likely to be aligned in the plane of the each film. These features depend on shapes of the flake powders which are numerally indicated by an aspect ratio. The aspect ratio Is defined as a ratio of an average particle diameter of the particle of the flake powder to an average thickness thereof (an average particle diameter/an average thickness). Since the non-magnetic substrate has the under-coat film on one face thereof and the back-coat film provided on the opposite face of the non-magnetic substrate to the said one face covered by the magnetic film, the stiffness of the whole magnetic recording medium is raised. Thus, it is realized to provide the relatively inexpensive magnetic recording medium which has splendid property of stable runability, high durability, and splendid electromagnetic transducing characteristics even under a small total thickness.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

The present invention is elucidated in detail with reference to the accompanying drawings and the following examples of video tapes. In these elucidation, parts of components are all by weight.

Embodiment 1

Figure 1:
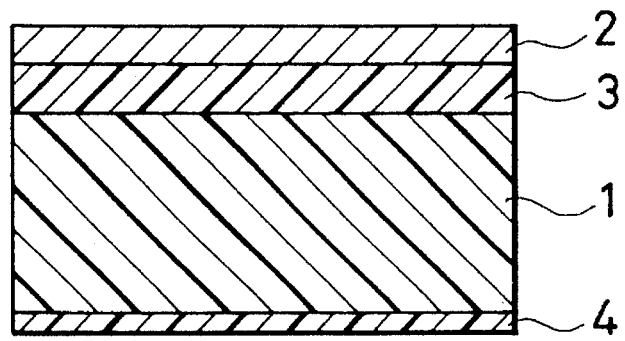
FIG. 1 is a cross-sectional view of a video tape of the Example 1 of the Embodiment 1 of the present invention.

FIG. 1 is a cross-sectional view of a video tape of Examples of the Embodiment 1 of the present invention. An under-coat film 3 is formed on a non-magnetic substrate 1, and a magnetic film 2 is formed on the under-coat film 3. A back-coat film 4 is formed on opposite face of the non-magnetic substrate 1 to the one face coated by the magnetic film 2.

A coating material which is used for making the magnetic film 2 to be formed on the substrate 1 is expressed as a magnetic coating material (M).

A coating material which is used for making the under-coat film 3 Including a flake powder in order to improve stiffness is expressed as a coating material (A-1), (A-2), ... or (A-6).

A coating material which is used for making the back-coat film 4 including a flake powder in order to improve stiffness is expressed as a coating material (B-1), (B-2), ... or (B-9).

Preparation of a magnetic coating material (M) to make a magnetic film used in all examples and comparison examples in the Embodiment 1 is explained below:

[The magnetic coating material (M)]

(a) Milling and dispersion of the following materials are made in a press kneader and further in a sand mill to make a composition:

| | |
|---|---|
| Ferromagnetic Co-doped $\gamma$-Fe$_2$O$_3$ | 100 parts |
| ( BET specific surface area = 50 m$^2$/g | |
| Hc = 900 Oe | |
| $\sigma$S = 78 emu/g ) | |
| Polyurethane resin | 10 parts |
| Vinyl chloride copolymer resin including hydroxyl group | 10 parts |
| $\alpha$-Al$_2$O$_3$ (Average particle diameter = 0.3 µm) | 7 parts |
| Carbon black (Average particle diameter = 50 nm) | 1 part |
| Myristic acid | 2 parts |
| n-Butyl stearate | 1 part |
| Organic solvent mixture (MEK*:toluene:cyclohexanone = 3:2:1) | 250 parts |

(*:Methyl ethyl ketone hereafter it is abbreviated to MEK).

(b) Admixing of 5 parts of a polyisocyanate compound "Coronate-L", which is supplied by Nippon Polyurethane Industry Co., Ltd. JAPAN) with the composition, is made to make an admixture; and (c) Filtrating the admixture through a filter of 1-µm mean pore size to make up the intended coating material (M) for the magnetic film use.

Preparation of a coating material herein referred to as (A-1) to make an under-coat film in the Embodiment 1 is explained below:

[The coating material (A-1)]

(a) Milling and dispersion of the following materials is made in a press kneader and further in a sand mill to make a composition:

| | |
|---|---|
| Flake powder of $\alpha$-Fe$_2$O$_3$ (which is flake powder of non-magnetic inorganic material) | 100 parts |
| ( Aspect ratio$^{(*1)}$ = 10 | |
| Average particle diameter = 0.08 µm ) | |
| Polyurethane resin*$^2$ | 14 parts |
| Vinyl chloride copolymer resin*$^2$ | 14 parts |
| Organic solvent mixture (MEK:toluene:cyclohexanone = 3:2:1) | 200 parts |

(b) Admixing 6 parts of a polyisocyanate compound$^{(*2)}$ ("Coronate-L") with the above-mentioned composition is made to make an admixture; and (c) Filtrating the admixture through a filter of 2 µm mean pore size to make up the intended coating material (A-1) for the under-coat film use.

(*1: The aspect ratio R is defined as a ratio of an average particle diameter of the particle of the flake powder to an average thickness thereof. (i.e. an average particle diameter/an average thickness. The average particle diameter is the averaged value of the maximum diameter and the minimum diameter in the plane of particles of the flake powder.)

(*2: These substances correspond with the binder(s).)

[The coating materials (A-2) ... (A-6)]

The coating materials herein referred to as (A-2), (A-3), (A-4), (A-5) and (A-6) to make respective under-coat films in the Embodiment 1 are prepared by the similar procedures to that of the coating material (A-1), and only difference is that the aspect ratio and the average particle diameter of the flake powder of $\alpha$—Fe$_2$O$_3$ used in respective coating materials are changed as shown in Table 1.

TABLE 1

| Coating material for an under-coat film | A-1 | A-2 | A-3 | A-4 | A-5 | A-6 |
|---|---|---|---|---|---|---|
| Aspect ratio | 10 | 20 | 50 | 80 | 110 | 140 |
| Average particle diameter (µm) | 0.08 | 0.2 | 0.3 | 0.6 | 0.9 | 1.4 |

Preparation of a coating material herein referred to as (B-1) to make a back-coat film in the Embodiment 1 is explained below:

[The coating material (B-1)]

(a) Milling and dispersion of the following materials is made in a press kneader and further in a sand mill to make a composition:

| | |
|---|---|
| Flake powder of $\alpha$-Fe$_2$O$_3$ (which is flake powder of non-magnetic inorganic material) | 75 parts |
| ( Aspect ratio = 10 | 75 parts |
| Average particle diameter = 0.08 µm ) | |
| Carbon black (Average particle diameter = 20 nm) | 25 parts |
| Polyurethane resin*$^1$ | 22 parts |
| Nitrocellulose resin*$^1$ | 22 parts |
| Organic solvent mixture (MEK:toluene:cyclohexanone = 3:2:1) | 250 parts |

(b) Adding 10 parts of a polyisocyanate compound ("Coronate-L") to the composition; and (c) The resulting mixture is filtered through a filter of 2 µm mean pore size to make up the intended coating material (B-1) for the back-coat film use.

(*1: These substances correspond with the binders)

[The coating materials (B-2) ... (B-6)]

The coating materials herein referred to as (B-2), (B-3), (B-4), (B-5) and (B-6) to make respective back-coat films in the Embodiment 1 are prepared by the similar procedure to that of the coating material (B-1), only differences are that the aspect ratio and the average particle diameter of the flake power of $\alpha$—Fe$_2$O$_3$ used in respective coating materials are changed as shown in Table 2.

TABLE 2

| Coating material for an back-coat film | B-1 | B-2 | B-3 | B-4 | B-5 | B-6 |
|---|---|---|---|---|---|---|
| Aspect ratio | 10 | 20 | 50 | 80 | 110 | 140 |
| Average particle diameter (μm) | 0.08 | 0.2 | 0.3 | 0.6 | 0.9 | 1.4 |

[EXAMPLE 1]

Video tape samples of this Example 1 were made by the following procedure:

STEP(A): The coating material (A-1) for an under-coat film was applied on a 6.3-μm thick PET film as the non-magnetic substrate 1, and dried;

STEP(B): The dried coating material (A-1) was mirror-finished by means of a calendar roll and then heat-treated to form a 2.2 μm thick under-coat film 3 on one face;

STEP(C): The coating material (M) for the magnetic film was applied on the under-coat film 3, and the applied coating material (M) was subjected to a known magnetic field orientation treatment and then dried;

STEP(D): The dried coating material (M) was mirror-finished by means of a calendar roll and then heat-treated to give a stock roll of PET film having a 2.5 μm thick magnetic film 2 on the face;

STEP(E): The coating material (B-1) for a back-coat film was applied on opposite face of the non-magnetic substrate 1 to the face coated by the magnetic film 2, dried and heat-treated to form a 0.8 μm thick back-coat film 4; and STEP(F): The coated film was slit to give ½ inch video tape samples (250 m long).

[EXAMPLES 2 ... 6]

Video tape samples of these Examples 2 ... 6 were made by the similar procedures to that of the Example 1, and only difference is that both the coating material (A-1) for an under-coat film and the coating material (B-1) for a back-coat film were changed as shown in Table 3.

TABLE 3

| Example | 1 | 2 | 3 | 4 | 5 | 6 |
|---|---|---|---|---|---|---|
| Coating material for an under-coat film | A-1 | A-2 | A-3 | A-4 | A-5 | A-6 |
| Coating material for a back-coat film | B-1 | B-2 | B-3 | B-4 | B-5 | B-6 |

[EXAMPLE 7]

Video tape samples of this Example 7 were made by the similar procedures to that of the Example 3, only difference is that a coating material herein referred to as (A-7) to make an under-coat film was used instead of the coating material (A-3). And the coating material (A-7) was prepared as follows:

(a) Milling and dispersion of the following materials are made in a press kneader and further in a sand mill to make a composition:

| | |
|---|---|
| Flake powder of α-Fe$_2$O$_3$ (which is flake powder of non-magnetic inorganic material) | 100 parts |
| ( Aspect ratio = 50<br>Average particle diameter = 0.3 μm ) | |
| Polyurethane resin | 28 parts |
| Vinyl chloride copolymer resin including hydroxyl group | 28 parts |
| Organic solvent mixture (MEK:toluene:cyclohexanone = 3:2:1) | 250 parts |

(b) Admixing of 11 parts of a polyisocyanate compound ("Coronate-L") with the composition is made to make an admixture; and (c) Filtrating the admixture through a filter of 2-μm mean pore size to make up the intended coating material (A-7) for the under-coat film use.

[EXAMPLE 8]

Video tape samples of this Example 8 were made by the similar procedures to that of the Example 3, and only difference is that a coating material therein referred to as (A-8) to make an under-coat film was used instead of the coating material (A-3). And the coating material (A-8) was prepared as follows:

(a) Milling and dispersion of the following materials is made in a press kneader and further in a sand mill to make a composition;

| | |
|---|---|
| Flake powder of α-Fe$_2$O$_3$ (which is flake powder of non-magnetic inorganic material) | 100 parts |
| ( Aspect ratio = 50<br>Average particle diameter = 0.3 μm ) | |
| Polyurethane resin | 9 parts |
| Vinyl chloride copolymer resin including hydroxyl group | 9 parts |
| Organic solvent mixture (MEK:toluene:cyclohexanone = 3:2:1) | 250 parts |

(b) Admixing of 4 parts of a polyisocyanate compound ("Coronate-L") with the composition is made to make an admixture; and (c) Filtrating the admixture through a filter of 2-μm mean pore size to make up the intended coating material (A-8) for the under-coat film use.

[EXAMPLE 9]

Video tape samples of this Example 9 were made by the similar procedures to that of the Example 3, and only difference is that a coating material therein referred to as (B-7) to make a back-coat film was used instead of the coating material (B-3). The coating material (B-7) was prepared as follows:

(a) Milling and dispersion of the following materials is made in a press kneader and further in a sand mill to make a composition:

| | |
|---|---|
| Flake powder of α-Fe$_2$O$_3$ (which is flake powder of non-magnetic inorganic material) | 65 parts |
| ( Aspect ratio = 50<br>Average particle diameter = 0.3 μm) | |

-continued

| | |
|---|---|
| Carbon black (average particle diameter = 20 nm) | 35 parts |
| Polyurethane resin | 34 parts |
| Nitrocellulose resin | 34 parts |
| Organic solvent mixture (MEK:toluene:cyclohexanone = 3:2:1) | 300 parts |

(b) Admixing of 14 parts of a polyisocyanate compound ("Coronate-L"), to the composition is made; and (c) The resulting mixture is filtered through a filter of 2-μm mean pore size to make up the intended coating material (B-7) for the back-coat film use.

[EXAMPLE 10]

Video tape samples of this Example 10 were made by the similar procedures to that of the Example 3, and only difference is that a coating material therein referred to as (B-8) to make a back-coat film was used instead of the coating material (B-3). And the coating material (B-8) was prepared as follows:

(a) Milling and dispersion of the following materials is made in a press kneader and further in a sand mill to make a composition;

| | |
|---|---|
| Flake powder of α-Fe$_2$O$_3$ (which is flake powder of non-magnetic inorganic material) $\begin{pmatrix} \text{Aspect ratio} = 50 \\ \text{Average particle diameter} = 0.3 \text{ μm} \end{pmatrix}$ | 65 parts |
| Carbon black (average particle diameter = 20 nm) | 35 parts |
| Polyurethane resin | 22 parts |
| Nitrocellulose resin | 22 parts |
| Organic solvent mixture (MEK:toluene:cyclohexanone = 3:2:1) | 250 parts |

(b) Admixing of 10 parts of a polyisocyanate compound ("Coronate-L"), to the composition is made; and (c) The resulting mixture is filtered through a filter of 2-μm mean pore size to make up the intended coating material (B-8) for the back-coat film use.

[EXAMPLE 11]

Video tape samples of this Example 11 were made by the similar procedures to that of the Example 3, and only difference is that a coating material therein referred to as (B-9) to make a back-coat film was used instead of the coating material (B-3). The coating material (B-9) was prepared as follows:

(a) Milling and dispersion of the following materials are made in a press kneader and further in a sand mill to make a composition:

| | |
|---|---|
| Flake powder of α-Fe$_2$O$_3$ (which is flake powder of non-magnetic inorganic material) $\begin{pmatrix} \text{Aspect ratio} = 50 \\ \text{Average particle diameter} = 0.3 \text{ μm} \end{pmatrix}$ | 65 parts |
| Carbon black (average particle diameter = 20 nm) | 35 parts |
| Polyurethane resin | 14 parts |
| Nitrocellulose resin | 14 parts |
| Organic solvent mixture (MEK:toluene:cyclohexanone = 3:2:1) | 200 parts |

(b) Admixing of 6 parts of a polyisocyanate compound ("Coronate-L"), to the composition is made; and (c) The resulting mixture is filtered through a filter of 2-μm mean pore size to make up the intended coating material (B-9) for the back-coat film use.

[Comparison example 1]

Video tape samples of this Comparison example 1 were made by the same procedure as that of the Example 3 except omission of the STEPs (A) and (B), hence omission of forming the under-coat film 3. And, further an 8.5-μm thick PET film was used as the non-magnetic substrate 1 instead of the 6.3-μm thick PET film. That is, the total thickness of the video tape samples of this Comparison example 1 became as same as that of the Example 3.

[Comparison example 2]

Video tape samples of this Comparison example 2 were made by the similar procedures to that of the Example 1, and only difference is that granular particles of α—Fe$_2$O$_3$ (having an average particle diameter of 0.1 μm) were used instead of the flake powder of α—Fe$_2$O$_3$ in the coating material (A-1) for the under-coat film.

[Comparison example 3]

Video tape samples of this Comparison example 3 were made by the similar procedure to that of the Example 1, and only difference is that granular particles of α—Fe$_2$O$_3$ (having average particle diameter of 0.1 μm) were used instead of the flake powder of α—Al$_2$O$_3$ in the coating material (B-1) for the back-coat film.

[Comparison example 4]

Video tape samples of this Comparison example 4 were made by the similar procedures to that of the Example 1, and only difference is that granular particles of α—Fe$_2$O$_3$ (having an average particle diameter of 0.1 μm) were used instead of both the flake powder of α—Fe$_2$O$_3$ in the coating material (A-1) for the under-coat film and in the coating material (B-1) for the back-coat film.

[Comparison example 5]

Video tape samples of this Comparison example 5 were made by the similar procedures to that of the Example 1, and only difference is that needle-shaped powder of α—Fe$_2$O$_3$ (major axis length=0.2 μm and minor axis length= 0.02 μm), was used instead of the flake powder of α—Fe$_2$O$_3$ in the coating material (A-1) for the under-coat film.

[Comparison example 6]

Video tape samples of this Comparison example 6 were made by the similar procedures to that of the Example 1, and only difference is that needle-shaped powder of α—Fe$_2$O$_3$ (major axis length=0.2 μm and minor axis length= 0.02 μm) was used instead of the flake powder of α—Fe$_2$O$_3$ in the coating material (B-1) for the back-coat film.

[Comparison example 7]

Video tape samples of this Comparison example 7 were made by the similar procedures to that of the Example 1, and only difference is that needle-shaped powder of α—Fe$_2$O$_3$ (major axis length=0.2 μm and minor axis length= 0.02 μm) was used instead of both the flake powder of α—Fe$_2$O$_3$ in the coating material (A-1) for the under-coat film and in the coating material (B-1) for the back-coat film.

Embodiment 2

Figure 2:
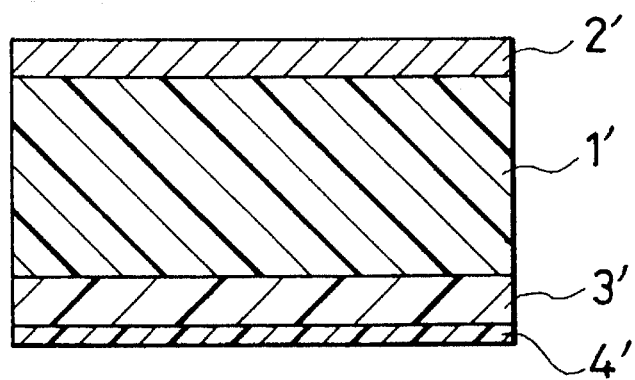
FIG. 2 is a cross-sectional view of a video tape of the Example 1' of the Embodiment 2 of the present invention.

FIG. 2 is a cross-sectional view of a video tape of Examples of the Embodiment 2 of the present invention. A magnetic film 2' is formed on a non-magnetic substrate 1', and an under-coat film 3' is formed on opposite face of the non-magnetic substrate 1' to the one face coated by the magnetic film 2'. And a back-coat film 4' is formed on the under-coat film 3'.

A coating material which is used for making the magnetic film 2' to be formed on the substrate 1' is expressed as a magnetic coating material (M').

A coating material which is used for making the under-coat film 3' including a flake powder in order to improve stiffness is expressed as a coating material (A'-1) (A'-2), . . . or (A'-6).

A coating material which is used for making the back-coat film 4' including a flake powder in order to improve stiffness is expressed as a coating material (B'-1), (B'-2), or . . . (B'-6).

Preparation of a coating material (M') to make a magnetic film used in all examples and comparison examples in the Embodiment 2 is explained below:

[The coating material (M')]

(a) Milling and dispersion of the following materials are made in a press kneader and further in a sand mill to make a composition:

| | |
|---|---|
| Ferromagnetic Co-doped τ-Fe$_2$O$_3$ | 100 parts |
| ( BET specific surface area = 50 m$^2$/g | |
| Hc = 780 Oe | |
| σS = 77 emu/g ) | |
| Polyurethane resin | 10 parts |
| Vinyl chloride copolymer resin including hydroxyl group | 10 parts |
| α-Al$_2$O$_3$ | 8 parts |
| (Average particle diameter = 0.3 μm) | |
| Carbon black | 1 part |
| (Average particle diameter = 50 nm) | |
| Organic solvent mixture | 200 parts |
| (MEK:toluene = 1:1) | |

(b) Admixing of the following materials is made during mixing in a disper to make an admixture; and

| | |
|---|---|
| Myristic acid | 1 part |
| n-Butyl stearate | 1 part |
| Polyisocyanate compound ("Coronate-L") | 5 parts |

(c) Filtrating the admixture through a filter of 1 μm mean pore size to make up the intended coating material (M') for the magnetic film use.

Preparation of a coating material herein referred to as (A'-1) to make an under-coat film in the Embodiment 2 is explained below:

[The coating material (A'-i)]

(a) Milling and dispersion of the following materials is made in a press kneader and further in a sand mill to make a composition:

| | |
|---|---|
| Flake powder of α-Fe$_2$O$_3$ (which is flake powder of non-magnetic inorganic material) | 100 parts |
| ( Aspect ratio = 140 | |
| Average particle diameter = 2.0 μm ) | |
| Nitrocellurose resin | 40 parts |
| Polyurethane resin | 40 parts |
| Organic solvent mixture | 400 parts |
| (MEK:toluene = 1:1) | |

(b) Admixing of 20 parts of a polyisocyanate compound ("Coronate-L") with the composition is made during mixing in a disper to make an admixture; and (c) Filtrating the admixture through a filter of 2 μm mean pore size to make up the intended coating material (A'-1) for the under-coat film use.

[The coating materials (A'-2) . . . (A'-6)]

The other coating materials herein referred to as (A'-2), (A'-3), (A'-4), (A'-5) and (A'-6) to make respective under-coat films in the Embodiment 2 are prepared by the similar procedures to that of the coating material (A'-1), and only difference is that the aspect ratio and the average particle diameter of the flake powder of α—Fe$_2$O$_3$ used in respective coating materials are changed as shown in Table 4.

TABLE 4

| Coating material for an under-coat film | A'-1 | A'-2 | A'-3 | A'-4 | A'-5 | A'-6 |
|---|---|---|---|---|---|---|
| Aspect ratio | 140 | 20 | 80 | 140 | 20 | 100 |
| Average particle diameter (μm) | 2.0 | 2.0 | 0.6 | 2.8 | 2.8 | 1.5 |

Preparation of a coating material herein referred to as (B'-1) to make a back-coat film in the Embodiment 2 is explained below:

[The coating material (B'-1)]

(a) Milling and dispersion of the following materials is made In a press kneader and further in a sand mill to make a composition:

| | |
|---|---|
| Flake powder of α-Al$_2$O$_3$ | 100 parts |
| ( Aspect ratio R = 80 | |
| Average particle diameter = 0.80 μm ) | |
| Carbon black | 5 parts |
| (Average particle diameter = 20 nm) | |
| Nitrocellulose resin | 40 parts |
| Polyurethane resin | 40 parts |
| Organic solvent mixture | 400 parts |
| (MEK:toluene = 1:1) | |
| (b) Admixing of the following materials is made during mixing in a disper to make an admixture. | |
| Stearic acid | 1 part |
| Polyisocyanate compound ("Coronate-L") | 20 parts |

(c) The resulting mixture is filtered through a filter of 2 μm mean pore size to make up the intended coating material (B'-1) for the back-coat film use.

[The coating materials (B'-2) . . . (B'-6)]

The other coating materials herein referred to as (B'-2), (B'-3), (B'-4), (B'-5) and (B'-6) to make respective back-coat films in the Embodiment 2 are prepared by the similar procedures to that of the coating material (B'-1), and only difference is that the aspect ratio and the average particle diameter of the flake power of α—Fe$_2$O$_3$ used in respective coating materials are changed as shown in Table 5.

TABLE 5

| Coating material for a back-coat film | B'-1 | B'-2 | B'-3 | B'-4 | B'-5 | B'-6 |
|---|---|---|---|---|---|---|
| Aspect ratio | 80 | 10 | 100 | 20 | 100 | 50 |
| Average particle diameter (μm) | 0.8 | 0.08 | 1.4 | 1.4 | 1.2 | 1.2 |

[EXAMPLE 1']

Video tape samples of this Example 1' were made by the following procedure:

STEP(A'): The coating material (M') for the magnetic film was applied on a 6.0 μm thick PET film as the non-magnetic substrate 1, and the applied coating material (M') was subjected to a known magnetic field orientation treatment and then dried.

STEP(B'): The dried coating material (M) was mirror-finished by means of a supercalender roll and then heat-treated to give a stock roll of PET film having a 2.0-μm thick magnetic film.

STEP(C'): The coating material (A'-1) for an under-coat film was applied on opposite face of the non-magnetic substrate 1 to the face coated by the magnetic film 2, and dried.

STEP(D'): The dried coating material (A'-1) was mirror-finished by means of a calendar roll and then heat-treated to form a 3.0 μm thick under-coat film 3'.

STEP(E'): The coating material (B'-1) for a back-coat film was applied on the under-coat film 3', dried and heat-treated to form a 0.7 μm thick back-coat film 4.

STEP(F'): The coated film was slit to give ½ inch video tape samples (250 m long).

[Examples 2'... 9']

Video tape samples of these Examples 2'... 9' were made by the similar procedures to that of the Example 1', and only difference is that both the coating material (A'-1) for an under-coat film and the coating material (B'-1) for a back-coat film were changed as shown in Table 6.

TABLE 6

| Example | 1' | 2' | 3' | 4' | 5' | 6' | 7' | 8' | 9' |
| --- | --- | --- | --- | --- | --- | --- | --- | --- | --- |
| Coating material for an under-coat film | A'-1 | A'-2 | A'-3 | A'-4 | A'-4 | A'-5 | A'-4 | A'-6 | A'-6 |
| Coating material for a back-coat film | B'-1 | B'-1 | B'-2 | B'-2 | B'-3 | B'-3 | B'-4 | B'-5 | B'-6 |

[Comparison example 1']

Video tape samples of this Comparison example 1' were made by the similar procedures to that of the Example 1', and only difference is that granular particles of α—$Fe_2O_3$ (having an average particle diameter of 0.2 μm) were used instead of the flake powder of α—$Fe_2O_3$ in the coating material (A'-1) for the under-coat film and needle-shaped powder of α—$Fe_2O_3$ (major axis length=0.2 μm and minor axis length=0.02 μm) was used instead of the flake powder of α—$Fe_2O_3$ in the coating material (B'-1) for the back-coat film.

[Comparison example 2']

Video tape samples of this Comparison example 2' were made by the similar procedures to that of the Comparison example 1', and only difference is that needle-shaped powder of α—$Fe_2O_3$ (major axial length=1.0 μm and minor axis length=0.05 μm) was used instead of the flake powder of α—$Fe_2O_3$ in the coating material (A'-1) for the under-coat film and granular particles of α—$Fe_2O_3$ (having an average particle diameter of 0.1 μm) were used instead of the flake powder of α—$Fe_2O_3$ in the coating material (B'-1) for the back-coat film.

[Comparison example 3']

Video tape samples of this Comparison example 3' were made by the similar procedures to that of the Comparison example 1', and only difference is that needle-shaped powder of α—$Fe_2O_3$ (major axis length=1.0 μm and minor axis length=0.05 μm) was used instead of the flake powder of α—$Fe_2O_3$ in the coating material (A'-1) for the under-coat film.

[Comparison example 4']

Video tape samples of this Comparison example 4' were made by the similar procedures to that of the Comparison example 1', and only difference is that granular particles of α—$Fe_2O_3$ (having an average particle diameter of 0.08 μm) were used instead of the flake powder of α—$Fe_2O_3$ in the coating material (B'-1) for the back-coat film.

[Comparison example 5']

Video tape samples of this Comparison example 5' were made by the similar procedures to that of the Example 3', and only difference is that flake powder of α—$Fe_2O_3$ (having an aspect ratio of 80 and an average particle diameter of 0.3 μm) was used instead of the flake powder of α—$Fe_2O_3$ in the coating material (A'-3) for the undercoat film.

[Comparison example 6']

Video tape samples of this Comparison example 6' were made by the similar procedures to that of the Example 3', and only difference is that flake powder of α—$Fe_2O_3$ (having an aspect ratio of 10 and an average particle diameter of 0.03 μm) was used instead of the flake powder of α—$Fe_2O_3$ in the coating material (B'-2) for the back-coat film.

[Comparison example 7']

Video tape samples of this Comparison example 7' were made by the similar procedures to that of the Example 4', and only difference is that flake powder of α—$Fe_2O_3$ (having an aspect ratio of 10 and an average particle diameter of 0.03 μm) was used instead of the flake powder of α—$Fe_2O_3$ in the coating material (B'-2) for the back-coat film.

[Comparison example 8']

Video tape samples of this Comparison example 8' were made by the similar procedures to that of the Example 3', and only difference is that flake powder of α—$Fe_2O_3$ (having an aspect ratio of 140 and an average particle diameter of 3.5 μm) was used instead of the flake powder of α—$Fe_2O_3$ in the coating material (A'-3) for the under-coat film.

[Comparison example 9']

Video tape samples of this Comparison example 9' were made by the similar procedures to that of the Example 4', and only difference is that flake powder of α—$Fe_2O_3$ (having an aspect ratio of 100 and an average particle diameter of 1.8 μm) was used instead of the flake powder of α—$Fe_2O_3$ in the coating material (B'-2) for the back-coat film.

[Comparison example 10']

Video tape samples of this Comparison example 10' were made by the similar procedures to that of the Example 5', and only difference is that flake powder of α—$Fe_2O_3$ (having an aspect ratio of 140 and an average particle diameter of 3.5 μm) was used instead of the flake powder of α—$Fe_2O_3$ in the coating material (A'-4) for the under-coat film.

[Comparison example 11']

Video tape samples of this Comparison example 11' were made by the same procedure as that of the Example 1' except omission of the STEP (E'), hence omission of forming the back-coat film. And, further a 6.7 αm thick PET film was used as the non-magnetic substrate 1' instead of the 6.0 αm thick PET film. That is, the total thickness of the video tape samples of this Comparison example 1' became as same as that of the Example 1'.

[Comparison example 12']

Video tape samples of this Comparison example 12' were made by the same procedure as that of the Example 1' except omission of the STEPs (C') and (D'), hence omission of forming the under-coat film. And, further a 9.0 αm thick PET film was used as the non-magnetic substrate 1' instead of the 6.0 αm thick PET film. That is, the total thickness of the video tape samples of this Comparison example 12' became as same as that of the Example 1'.

The following evaluation tests were made on different video tape samples obtained in the foregoing examples and comparison examples of both the Embodiments 1 and 2.

(1) [Surface roughness of the back-coat film and the magnetic film]

Surface roughness was measured by a "TARYSTEP-1" touching type surface roughness meter manufactured by RANK TAYLOR HOBSON Inc. of U.S.A. The value of the surface roughness is given as the square root of the square-sum of peak height on a chart indicating surface roughness. (Reference: National Technical Report vol. 28 No. 3 June 1982 P. 520 published by MATSUSHITA ELECTRIC INDUSTRIAL CO., LTD.)

(2) [Dynamic frictional coefficient (μk)]

The tape sample was wound on and around a post of 4 mmφ made of SUS303 (Japanese Industrial Standard)-stainless steel at a winding angle of about 180° wherein the surface of the magnetic film was in touch with the post, tension at winding-in side of the post was 20 g, and running speed was 3.3 cm/sec. And the tension (X g) at feeding-out side of the post was determined. The dynamic frictional coefficient (μk) is defined by the following equation (1):

$$\mu k = (1/\pi) \cdot ln(X/20) \ldots \quad (1).$$

(3) [Stiffness of a tape (mg)]

Both values of stiffness of lengthwise direction of a video tape and that of widthwise direction thereof were measured by a stiffness tester (manufactured by TOYOSEIKI Inc. JAPAN). And the stiffness of widthwise direction was measured through a tape sample which was obtained by slitting the film in widthwise direction thereof.

(4) [RF output at 7 MHz (dB)]

An RF output (at 7 MHz) of each sample video tape was measured by using an S-VHS system VTR type "NV-FS" 1 manufactured by Matsushita Electric Industrial Co., Ltd. JAPAN. The measured RF output were expressed in terms of the values relative to that of a standard tape for the S-VHS system (having about 19 μm thickness).

(5) [Running durability]

After repeating 100 times of running (in a play-back state) of each video tape example under the condition of 40° C.—80% relative humidity (RH) the shape of the tape was observed. Pictures and sounds in play-back states were also observed.

The results of the observation were accessed and classified into grades defined as follows:

(i) Good:

No undulant-shaped side edge of a tape is observed and, no fold of side edge of a tape is observed.

(ii) Fair:

Only a tendency of undulant-shaped side edge of tape is observed, and/or only tendency of fold of side edge of a tape is observed, but there is no problem for practical use.

(iii) Poor:

Numerous folds of side edge of a tape are observed. And undesirable omission of sound and disorder of the picture are observed.

(iv) Very poor:

Numerous parts of undulant-shaped side edge of a tape are observed and numerous folds of side edge of a tape are observed. And undesirable omission of sound and disorder of the picture are observed remarkably.

Tables 7 and 8 show results of these evaluation tests as to each sample tapes obtained in the respective Embodiments 1 and 2.

TABLE 7

| | (1)Surface roughness[nm] | | (2)Dynamic frictional coefficient (μk) | (3)Stiffness [mg] of a tape in | | (4)RF output [dB] at 7MHz | (5)Running durability |
|---|---|---|---|---|---|---|---|
| | Magnetic film | Back-coat film | of the back-coat film | Lengthwise direction | Widthwise direction | | |
| Example 1 | 9.6 | 46 | 0.17 | 115 | 97 | +0.4 | Fair |
| Example 2 | 10.1 | 50 | 0.16 | 120 | 102 | +0.5 | Fair |
| Example 3 | 10.4 | 53 | 0.15 | 123 | 105 | +0.6 | Good |
| Example 4 | 10.8 | 57 | 0.14 | 126 | 107 | +0.5 | Good |

TABLE 7-continued

|  | (1)Surface roughness[nm] | | (2)Dynamic frictional coefficient (μk) of the back-coat film | (3)Stiffness [mg] of a tape in | | (4)RF output [dB] at 7MHz | (5)Running durability |
| --- | --- | --- | --- | --- | --- | --- | --- |
|  | Magnetic film | Back-coat film |  | Lengthwise direction | Widthwise direction |  |  |
| Example 5 | 11.1 | 61 | 0.14 | 129 | 111 | +0.3 | Good |
| Example 6 | 11.5 | 65 | 0.13 | 125 | 107 | +0.1 | Good |
| Example 7 | 9.9 | 51 | 0.15 | 127 | 106 | +0.4 | Good |
| Example 8 | 11.4 | 56 | 0.14 | 129 | 111 | +0.3 | Good |
| Example 9 | 10.0 | 44 | 0.17 | 120 | 100 | +0.6 | Fair |
| Example 10 | 10.4 | 51 | 0.16 | 123 | 103 | +0.4 | Fair |
| Example 11 | 11.0 | 59 | 0.14 | 128 | 107 | +0.3 | Good |
| Comparison example 1 | 10.1 | 53 | 0.16 | 107 | 83 | −0.1 | Poor |
| Comparison example 2 | 10.2 | 47 | 0.17 | 108 | 85 | −0.1 | Poor |
| Comparison example 3 | 9.6 | 50 | 0.16 | 95 | 77 | −0.3 | Poor |
| Comparison example 4 | 10.2 | 51 | 0.16 | 93 | 72 | −0.3 | Very poor |
| Comparison example 5 | 11.6 | 47 | 0.17 | 111 | 84 | −0.4 | Poor |
| Comparison example 6 | 10.7 | 67 | 0.14 | 101 | 77 | −0.3 | Poor |
| Comparison example 7 | 12.1 | 70 | 0.14 | 100 | 70 | −0.6 | Very Poor |

TABLE 8

|  | (1)Surface roughness[nm] | | (2)Dynamic frictional coefficient (μk) of the back-coat film | (3)Stiffness [mg] of a tape in | | (4)RF output [dB] at 7 MHz | (5)Running durability |
| --- | --- | --- | --- | --- | --- | --- | --- |
|  | Magnetic film | Back-coat film |  | Lengthwise direction | Widthwise direction |  |  |
| Example 1 | 9.3 | 50 | 0.16 | 140 | 100 | +0.8 | Good |
| Example 2 | 9.5 | 60 | 0.13 | 130 | 95 | +0.7 | Good |
| Example 3 | 8.9 | 40 | 0.18 | 117 | 90 | +0.9 | Good |
| Example 4 | 9.3 | 60 | 0.15 | 140 | 100 | +0.8 | Good |
| Example 5 | 10.0 | 70 | 0.13 | 148 | 110 | +0.2 | Good |
| Example 6 | 10.5 | 80 | 0.13 | 130 | 100 | +0.1 | Good |
| Example 7 | 10.0 | 75 | 0.13 | 130 | 100 | +0.2 | Good |
| Example 8 | 9.3 | 50 | 0.18 | 130 | 100 | +0.8 | Good |
| Example 9 | 9.5 | 55 | 0.17 | 125 | 90 | +0.6 | Good |
| Comparison example 1 | 10.8 | 55 | 0.14 | 110 | 75 | +0.4 | Poor |
| Comparison example 2 | 11.6 | 62 | 0.13 | 120 | 70 | −0.2 | Poor |
| Comparison example 3 | 11.0 | 56 | 0.13 | 125 | 70 | −0.1 | Poor |
| Comparison example 4 | 11.0 | 66 | 0.13 | 100 | 75 | −0.1 | Poor |
| Comparison example 5 | 9.2 | 45 | 0.14 | 100 | 75 | +0.7 | Poor |
| Comparison example 6 | 9.5 | 40 | 0.20 | 105 | 79 | +0.5 | Poor |
| Comparison example 7 | 12.5 | 85 | 0.14 | 140 | 101 | −0.3 | Poor |
| Comparison example 8 | 13.0 | 90 | 0.13 | 130 | 95 | −0.5 | Good |
| Comparison example 9 | 13.0 | 85 | 0.13 | 146 | 110 | −0.5 | Good |
| Comparison example 10 | 12.8 | 83 | 0.14 | 130 | 105 | −0.3 | Good |
| Comparison example 11 | 15.0 | 95 | 0.15 | 115 | 115 | −0.5 | Poor |
| Comparison example 12 | 9.5 | 40 | 0.12 | 100 | 100 | −0.1 | Poor |

Figure 3:
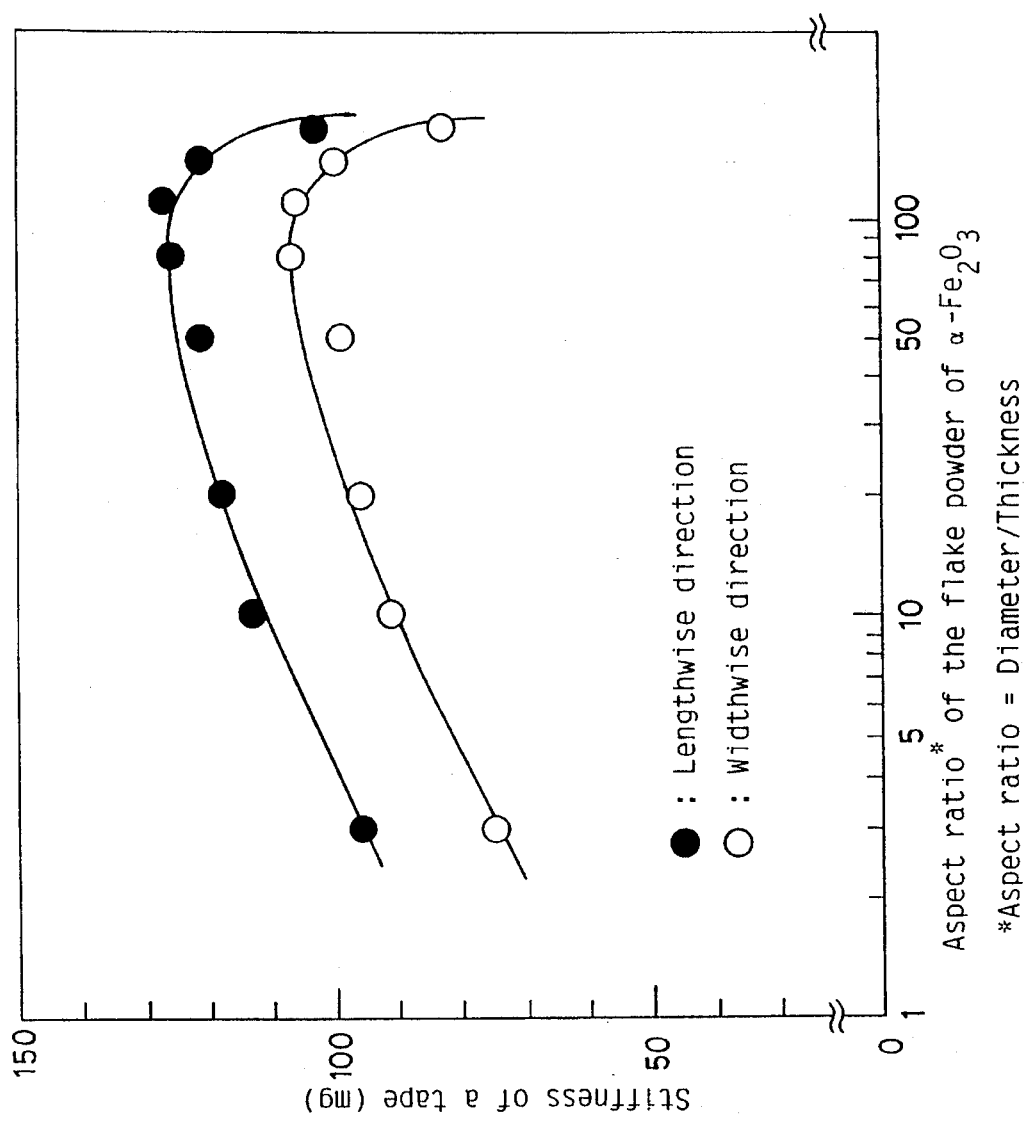
FIG. 3 is a graph showing the relation between the stiffness and the aspect ratio of the flake powder of $\alpha$—$Fe_2O_3$ (having an average particle diameter of 0.6 μm) in the coating material (A-4) for the under-coat film of the Example 4.

FIG. 3 is a graph showing the relation between the stiffness and the aspect ratio of the flake powder of α—$Fe_2O_3$ (having an average particle diameter of 0.6 μm) in the coating material (A-4) for the under-coat film of the Example 4.

Figure 4:
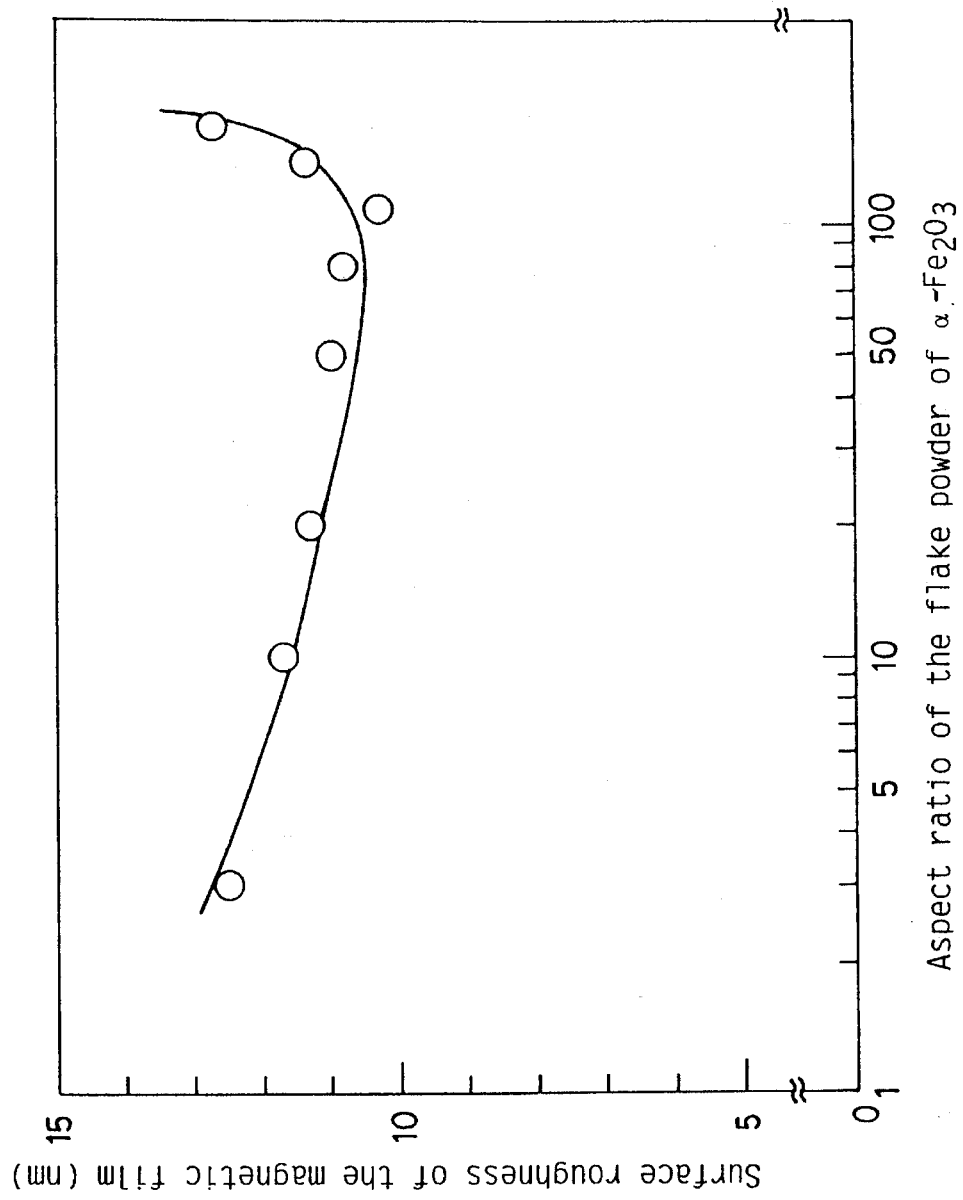
FIG. 4 is a graph showing the relation between the surface roughness of the magnetic film and the aspect ratio of the flake powder of $\alpha$—$Fe_2O_3$ (having an average particle diameter of 0.6 μm) in the coating material (A-4) for the under-coat film of the Example 4.

FIG. 4 is a graph showing the relation between the surface roughness of the magnetic film and the aspect ratio of the flake powder of α—Fe$_2$O$_3$ (having an average particle diameter of 0.6 μm) in the coating material (A-4) for the under-coat film of the Example 4.

Figure 5:
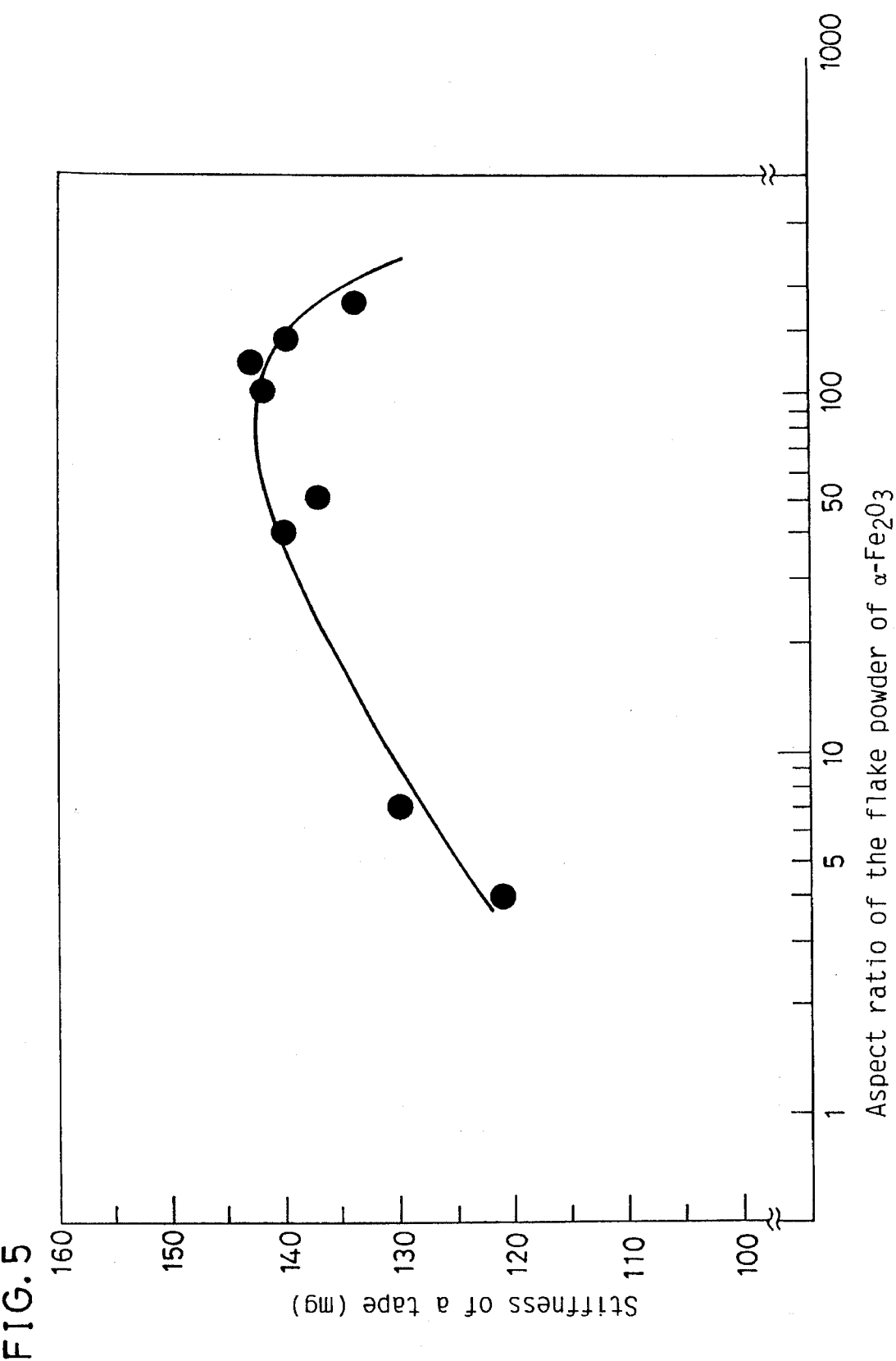
FIG. 5 is a graph showing the relation between the stiffness and the aspect ratio of the flake powder of $\alpha$—$Fe_2O_3$ (having an average particle diameter of 2.0 μm) in the coating material (A'-1) for the under-coat film of the Example 1'.

FIG. 5 is a graph showing the relation between the stiffness and the aspect ratio of the flake powder of α—Fe$_2$O$_3$ (having an average particle diameter of 2.0 μm) in the coating material (A'-1) for the under-coat film of the Example 1'.

Figure 6:
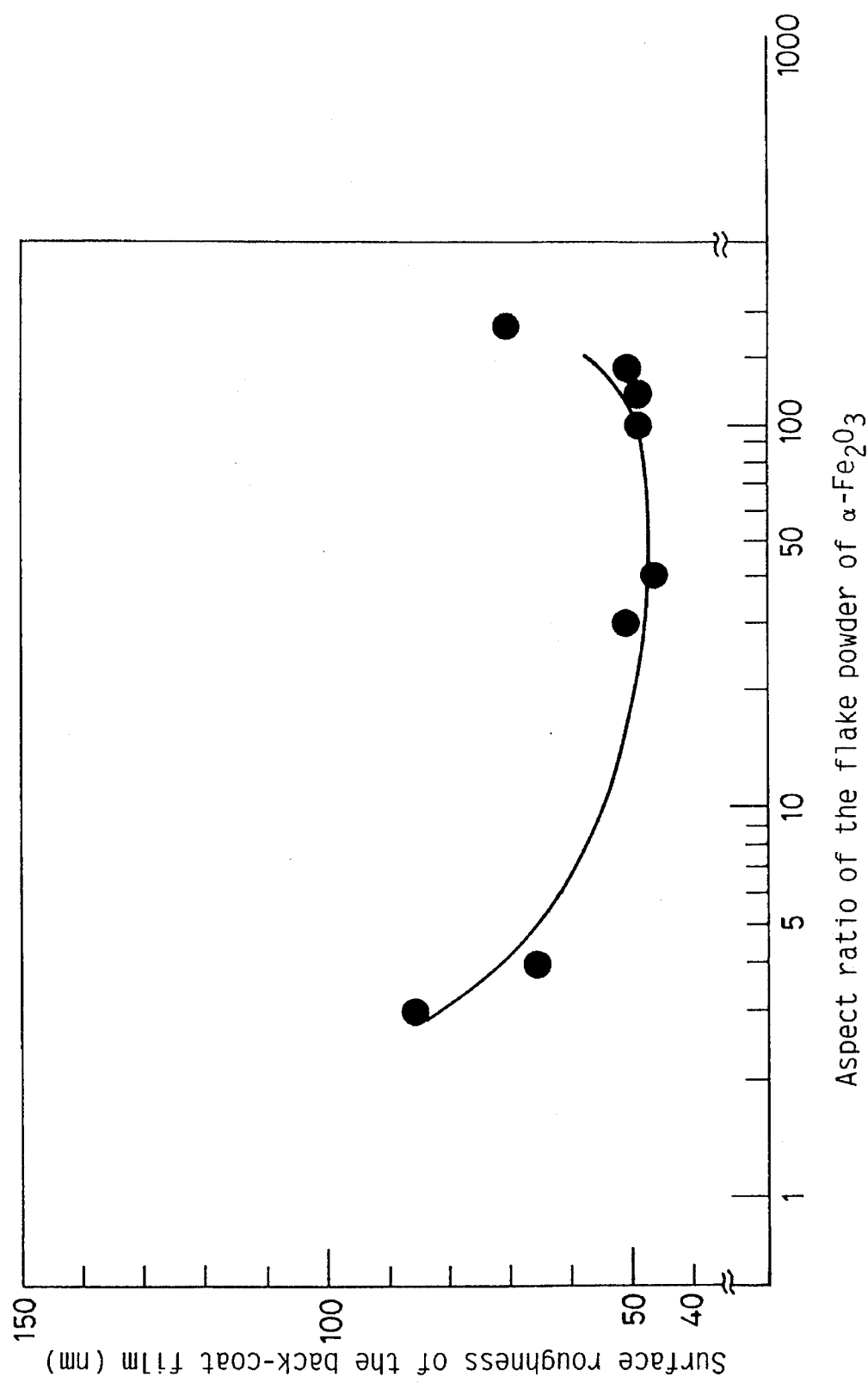
FIG. 6 is a graph showing the relation between the surface roughness of the back-coat film and the aspect ratio of the flake powder of $\alpha$—$Fe_2O_3$ (having an average particle diameter of 2.0 μm) in the coating material (A'-1) for the under-coat film of the Example 1'.

FIG. 6 is a graph showing the relation between the surface roughness of the back-coat film and the aspect ratio of the flake powder of α—Fe$_2$O$_3$ (having an average particle diameter of 2.0 μm) in the coating material (A'-1) for the under-coat film of the Example 1'.

Figure 7:
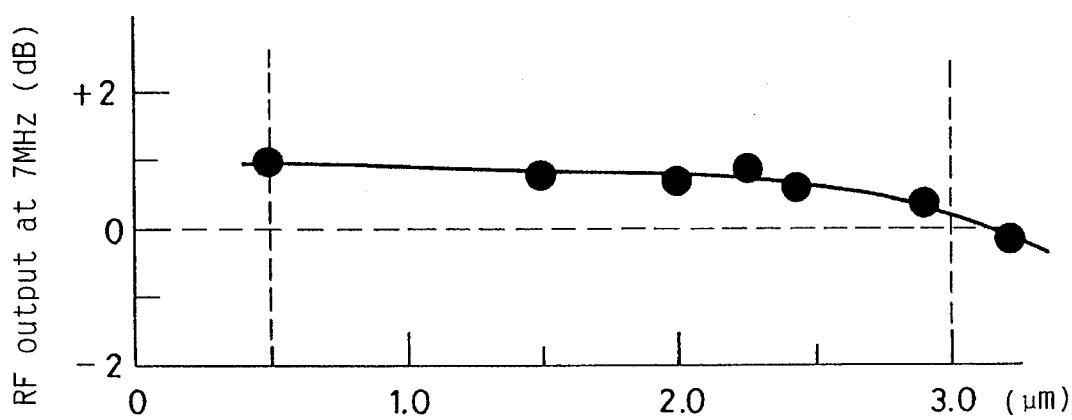
FIG. 7 is a graph showing the relation between the RF output and the average particle diameter of the flake powder of $\alpha$—$Fe_2O_3$ (having an aspect ratio of 100) in the coating material (A'-1) for the under-coat film of the Example 1'.

FIG. 7 is graph showing the relation between the RF output and the average particle diameter of the flake powder of α—Fe$_2$O$_3$ (having an aspect ratio of 100) in the coating material (A'-1) for the under-coat film of the Example 1'.

Figure 8:
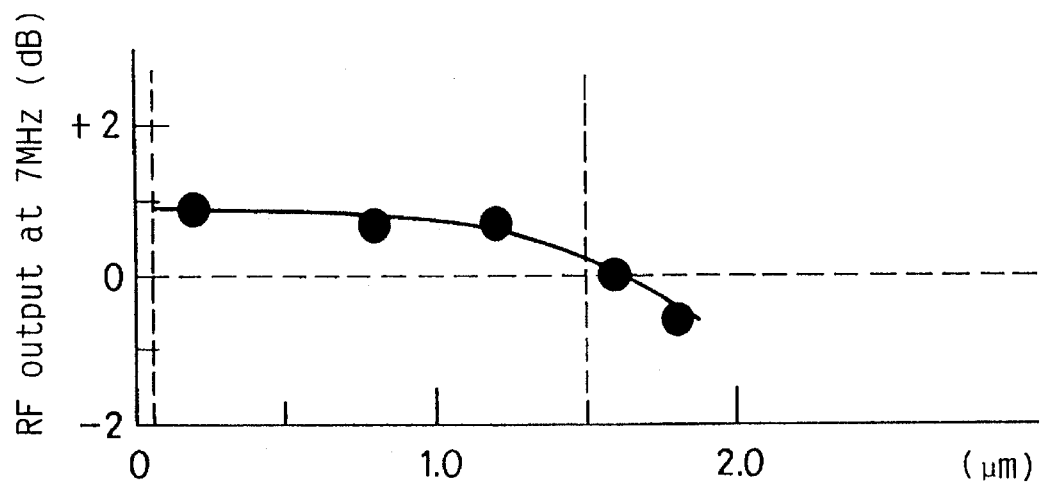
FIG. 8 is a graph showing the relation between the RF output and the average particle diameter of the flake powder of $\alpha$—$Fe_2O_3$ (having an aspect ratio of 80) in the coating material (B'-1) for the back-coat film of the Example 1'.

FIG. 8 is a graph showing the relation between the RF output and the average particle diameter of the flake powder of α—Fe$_2$O$_3$ (having an aspect ratio of 80) in the coating material (B'-1) for the back-coat film of the Example 1'.

From the above-mentioned results, it is shown that the magnetic recording tape of the present invention has splendid property of electromagnetic transducing characteristics and high running durability in spite of thinning the total thickness thereof.

With respect to other examples which use flake powdered graphite, kaolinire, mica or zinc oxide, similar effects as mentioned above were observed.

The above-mentioned embodiment is elucidated with respect to only the examples which are used as video tapes for the S-VHS system VTR, but it goes without saying that the magnetic recording medium of the present invention is applicable to a video tape for an 8 mm VTR or the like, a magnetic tape for audio, a magnetic tape for computer, or a disk-shaped magnetic recording medium such as a floppy disk.

From the data shown in Tables 7 and 8 and FIGS. 3, 4, 5, 6, 7 and 8 and other experiments the following conclusion was obtained:

In order to reduce anisotropy of the elastic modulus in the planar direction of the under-coat film and the back-coat film and In order to obtain the under-coat film and the back-coat film having high elastic modulus, flake powder of non-magnetic inorganic material should be mixed with binder(s) to form the under-coat film and the back-coat film. And it is preferable to raise an aspect ratio of the flake powder and a packing density thereof in the film, in order to obtain a good effect of the flake powder.

The plane of the flake powder Is not limited to a particular shape, but preferable shapes are a circle shape, an elliptic shape, a triangular shape, a quadrangular shape, a polygonal shape, and the like.

An average particle diameter is the averaged value of the maximum diameter and the minimum diameter in the plane of particles of the flake powder. The measurement of the average particle diameter and the average thickness can be made by a transmission type electron microscope or a scanning type one.

The following conclusion was obtained especially from FIG. 3, 4, 5 and 6. Effective range of the aspect ratio of the flake powder is from 5 to 150.

In case the aspect ratio of the flake powder is less than 5, it is difficult to obtain sufficient value of the elastic modulus of the under-coat film or the back-coat film, thereby, making It difficult to raise the elastic modulus (the stiffness) of the tape sufficiently. In contrast, in case the aspect ratio of the flake powder is more than 150, it results in lowering of improvement of the elastic modulus and deterioration of surface smoothness of the coated film owing to poor alignment of the flake powder in the coated film, since undesirable breaking of the particles of the flake powder is likely to occur on the occasion of dispersion of the flake powder in the binder(s). Please notice FIGS. 3, 4, 5 and 6.

The following conclusion was obtained especially from Table 7, which shows experimental results as to the magnetic recording medium (tape) shown in FIG. 1. Effective range of the average particle diameter of the particles of the flake powder used in the under-coat film 3 and back-coat film 4 in FIG. 1 is from 0.05 μm to 1.5 μm. In case the average particle diameter of the particles of the flake powder is less than 0.05 μm, it is necessary to use the particles having very thin average thickness which is suitable for the above-mentioned effective range of the aspect ratio. Owing to the thin thickness, the undesirable breaking of the particles of the flake powder is apt to occur on the occasion of dispersion of the flake powder in the binder(s). Thereby, it is not realized to raise the elastic modulus sufficiently. In contrast, in case the average particle diameter of particles of the flake powder is more than 1.5 μm, it is difficult to keep a sufficient smoothness of the under-coat film.

The following conclusion was obtained especially from Table 8, which shows experimental results as to the magnetic recording medium (tape) shown in FIG. 2. Effective range of the average particle diameter of the particles of the flake powder used in the under-coat film 3' in FIG. 2 is from 0.5 μm to 3.0 μm. And effective range of the average particle diameter of the particles of the flake powder used in the back-coat film 4' in FIG. 2 is from 0.05 μm to 1.5 μm. In case the average particle diameter of the particles of the flake powder used in the under-coat film 3' is less than 0.5 μm, it is difficult to improve the stiffness. In contrast, in case the average particle diameter of the particles of the flake powder used in the under-coat film 3' is more than 3.0 μm, surface smoothness of the under-coat film 3' becomes poor, so that surface smoothness of the back-coat film 4' formed on the under-coat film 4' was deteriorated resultantly. Thus, electromagnetic transducing characteristic (i.e. RF output) was deteriorated as shown in FIG. 7.

In case the average particle diameter of the particles of the flake powder used in the back-coat film 4' is less than 0.05 μm, it is difficult to obtain not only sufficient dispersion but also improved stiffness. In contrast, in case average particle diameter of the particles of the flake powder used in the back-coat film 4' is more than 1.5 μm, surface smoothness of the back-coat film 4' is deteriorated, so that the surface of the magnetic film is deteriorated owing to transcription of the deteriorated surface of the back-coat film 4' onto the surface of the magnetic film 2'. It results in deteriorated electromagnetic transducing characteristic (i.e. RF output) which was shown in FIG. 8.

Any powdered non-magnetic Inorganic material having the shape of particles which satisfy the above-mentioned all effective ranges (of e.g. the aspect ratio and so on) can be used as the flake powder, and examples of the materials (for the flake powder of non-magnetic material), are α—Fe$_2$O$_3$, kaolinire, mica, zinc oxide etc. These materials may be used alone or in combination.

The above-mentioned materials except natural one for the flake powder can be produced by a known method. For example, the flake powder of α—Fe$_2$O$_3$ is produced by gradual decomposition of triethanolamine iron (m) complex through a hydrothermal reaction. The flake powder of $\alpha$—$Fe_2O_3$ is also produced by a hydrothermal treatment of amorphous iron (U) hydroxide (which is produced by a reaction of concentrated aqueous solution of iron sulfate with aqueous solution of sodium hydroxide) in alkaline aqueous solution. And further, it may be preferable to add an agent for controlling crystal growth, which agent is composed, for instance, of d-tartaric acid, l-tartaric acid and/or derivative therefrom in the above-mentioned hydrothermal treatment.

It is preferable to add carbon black with the flake powder in the back-coat film for the purpose of obtaining antistatic characteristic and improved shielding from light. Furnace black, thermal black, black for coloring, acetylene black and the like may be used alone or in combination with the carbon black for the back-coat film.

Effective and preferable relative compounding ratio of the flake powder of inorganic material to the binder(s) in the under-coat film is from 100 parts to 600 parts per 100 parts (in weight) of the binder(s). In case the relative compounding ratio is less than 100 parts, it is difficult to obtain a sufficiently high elastic modulus of the under-coat film. In contrast, in case the relative compounding ratio is more than 600 parts, the smoothness of the under-coat film is lowered, and further the reduced amount of the binder(s) is likely to lead insufficient dispersion of the powder of inorganic material in the under-coat film thereby to lower the smoothness of the under-coat film and to weaken the under-coat film.

Effective and preferable relative compounding ratio of the powder of non-magnetic material (which includes both the flake powder and the carbon black) to the binder(s) in the back-coat film is from 100 parts to 600 parts per 100 parts (in weight) of the binder(s). And, it is necessary to keep a relative compounding ratio of 60 weight % and over of the flake powder in the powder of non-magnetic material. In case a relative compounding ratio of the flake powder to the binder(s) is less than 60 parts, it is difficult to obtain a sufficiently high elastic modulus and a high wear resistance of the back-coat film and smoothness is deteriorated. In contrast, in case the relative compounding ratio is more than 600 parts, the smoothness of the back-coat film is lowered, and further the reduced amount of the binder(s) is likely to lead insufficient dispersion of the powder of inorganic material in the back-coat film, thereby to lower the smoothness of the back-coat film and to weaken the under-coat film.

The binder(s) used in the under-coat film and the back-coat film of the present invention can be chosen from the following wide variety of known binder(s) such as, combination of isocyanate compounds with thermoplastic resins, for instance cellulosic resins, nitro cellulosic resins, polyurethane resins, polyvinyl chloride resins, polyester resins, acrylic resins, and rubberous resins and also, combinations of the thermoplastic resins with resins or compounds having radiation-responsive unsaturated double bonds. The binder(s) which is similar to those binders can be used in the magnetic film. Further, it is possible to add a fatty acid and/or a fatty acid ester, and/or several kinds of surface-active agent as a dispersant or a lubricant in addition to the combination. These additives may be used alone or in combination.

Aluminum oxide (alumina), chromium oxide, silicon oxide, rouge (red oxide) and the like can be used as the abrasive in the back-coat film.

An oxide magnetic material, a magnetic metal or a magnetic alloy is usable as a magnetic material to form the magnetic film. Examples of such oxide magnetic materials are $\Gamma$—$Fe_2O_3$, Co-doped $\Gamma$—$Fe_2O_3$, Co-doped $Fe_3O_4$, $CrO_2$, barium ferrite etc. Examples of such magnetic metal and alloy are Fe, Fe-Ni, Fe-Co, etc.

Suitable materials for the non-magnetic substrate used in the magnetic recording medium of the present invention is as follows: polyesters such as PET and PEN; polyolefins such as polyethylene and polypropylene; cellulose derivatives such as cellulose triacetate and cellulose diacetate; other organic compounds such as polycarbonate, polyvinl chloride, polyimide, aromatic polyamide and or the like. Among these materials, the polyesters are most preferable, by synthesizing the whole characteristics thereof such as high durability, high stiffness (strength) and inexpensive cost.

Various kinds of mixers may be used for milling and dispersing the coating materials for such as the under-coat film, the back-coat film and the magnetic film. Examples of such mixers are a roll mill, a kneader, an attriter, a double planetary mixer, a high-speed mixer, a high-speed stone mill, an agitator mill, a sand mill, a pin mill, a ball mill, a pebble mill, a high-speed stirrer, and an ultrasonic dispersion equipment, which are usable alone or in combination.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A magnetic recording medium comprising:

a non-magnetic substrate;

a magnetic film formed adjacent to a first surface of said non-magnetic substrate;

a back-coat film formed adjacent to a second surface of said non-magnetic substrate, said back-coat film having a first flake powder of $\alpha$—$Fe_2O_3$ and a binder, said first flake powder having a shape defined by an aspect ratio ranging from 5:1 to 150:1, said aspect ratio being a ratio of an average particle diameter of said first flake powder to an average thickness of said first flake powder, said average particle diameter of said first flake powder ranging from 0.05 μm to 1.5 μm;

a first under-coat film formed between said non-magnetic substrate and said magnetic film, said first under-coat film having a second flake powder of $\alpha$—$Fe_2O_3$ and a binder, said second flake powder having a shape defined by an aspect ratio ranging from 5:1 to 150:1, said aspect ratio being a ratio of an average particle diameter of said second flake powder to an average thickness of said second flake powder, and said average particle diameter of said second flake powder ranging from 0.05 μm to 1.5 μm; and a second under-coat film formed between said non-magnetic substrate and said back-coat film, said second under-coat film having a third flake powder of $\alpha$—$Fe_2O_3$ and a binder, said third flake powder having a shape defined by an aspect ratio ranging from 5:1 to 150:1, said aspect ratio being a ratio of an average particle diameter of said third flake powder to an average thickness of said third flake powder, and said average particle diameter of said third flake powder ranging from 0.5 μm to 3.0 μm.

2. A magnetic recording medium in accordance with claim 1, wherein the amount of said second flake powder relative to said binder is in the range of from 100 parts to 600 parts per 100 parts in weight of said binder, the amount of said third flake powder to said binder is in the range of from 100 parts to 600 parts per 100 parts in weight of said binder, and the amount of said first flake powder to said binder is in the range of from 100 parts to 600 parts per 100 parts in weight of said binder.

3. A magnetic recording medium in accordance with claim 1, wherein the amount of said second flake powder relative to said binder is in the range of from 100 parts to 600 parts per 100 parts in weight of said binder, the amount of said third flake powder to said binder is in the range of from 100 parts to 600 parts per 100 parts in weight of said binder, the amount of said first flake powder to said binder is in the range of from 100 parts to 600 parts per 100 parts in weight of said binder, and the amount of each of said first, second, and third flake powders relative to material other than said binder which are present in said first and second under-coat films and said back-coat film is in the range of 80 weight % and over.

4. A magnetic recording medium comprising:

a non-magnetic substrate;

a magnetic film formed adjacent to a first surface of said non-magnetic substrate;

a back-coat film formed adjacent to a second surface of said non-magnetic substrate, said back-coat film having a first flake powder of $\alpha$—$Fe_2O_3$ and a binder, said first flake powder having a shape defined by an aspect ratio ranging from 5:1 to 150:1, said aspect ratio being a ratio-of an average particle diameter of said first flake powder to an average thickness of said first flake powder, said average particle diameter of said first flake powder ranging from 0.05 µm to 1.5 µm; and an under-coat film formed between said non-magnetic substrate and said magnetic film, said first under-coat film having a second flake powder of $\alpha$—$Fe_2O_3$ and a binder, said second flake powder having a shape defined by an aspect ratio ranging from 5:1 to 150:1, said aspect ratio being a ratio of an average particle diameter of said second flake powder to an average thickness of said second flake powder, and said average particle diameter of said second flake powder ranging from 0.05 µm to 1.5 µm.

5. A magnetic recording medium in accordance with claim 4, wherein the amount of said second flake powder relative to said binder is in the range of from 100 parts to 600 parts per 100 parts in weight of said binder, and the amount of said first flake powder to said binder is in the range of from 100 parts to 600 parts per 100 parts in weight of said binder.

6. A magnetic recording medium in accordance with claim 4, wherein the amount of said second flake powder relative to said binder is in the range of from 100 parts to 600 parts per 100 parts in weight of said binder, the amount of said first flake powder to said binder is in the range of from 100 parts to 600 parts per 100 parts in weight of said binder, and the amount of each of said first and second flake powders relative to materials other than said binder which are present in said under-coat film and said back-coat film is in the range of 80 weight % and over.

7. A magnetic recording medium comprising:

a non-magnetic substrate;

a magnetic film formed adjacent to a first surface of said non-magnetic substrate;

a back-coat film formed adjacent to a second surface of said non-magnetic substrate, said back-coat film having a first flake powder of $\alpha$—$Fe_2O_3$ and a binder, said first flake powder having a shape defined by an aspect ratio ranging from 5:1 to 150:1, said aspect ratio being a ratio of an average particle diameter of said first flake powder to an average thickness of said first flake powder, said average particle diameter of said first flake powder ranging from 0.05 µm to 1.5 µm; and an under-coat film formed between said non-magnetic substrate and said back-coat film, said second under-coat film having a second flake powder of $\alpha$—$Fe_2O_3$ and a binder, said second flake powder having a shape defined by an aspect ratio ranging from 5:1 to 150:1, said aspect ratio being a ratio of an average particle diameter of said second flake powder to an average thickness of said second flake powder, and said average particle diameter of said second flake powder ranging from 0.5 µm to 3.0 µm.

8. A magnetic recording medium in accordance with claim 7, wherein the amount of said second flake powder to said binder is in the range of from 100 parts to 600 parts per 100 parts in weight of said binder, and the amount of said first flake powder to said binder is in the range of from 100 parts to 600 parts per 100 parts in weight of said binder.

9. A magnetic recording medium in accordance with claim 7, wherein the amount of said second flake powder to said binder is in the range of from 100 parts to 600 parts per 100 parts in weight of said binder, the amount of said first flake powder to said binder is in the range of from 100 parts to 600 parts per 100 parts in weight of said binder, and the amount of each of said first and second flake powders relative to materials other than said binder which are present in said under-coat film and said back-coat film is in the range of $\lambda$1 weight % and over.

* * * * *